(12) United States Patent
Isoda et al.

(10) Patent No.: US 10,556,399 B2
(45) Date of Patent: Feb. 11, 2020

(54) PLASTIC LAMINATE STRUCTURE AND TOUCH SENSING DEVICE HAVING THE SAME

(71) Applicant: HOSIDEN CORPORATION, Yao-shi, Osaka (JP)

(72) Inventors: Takeshi Isoda, Yao (JP); Naoki Shiga, Yao (JP)

(73) Assignee: HOSIDEN CORPORATION, Yao-Shi, Osaka (JP)

( * ) Notice: Subject to any disclaimer, the term of this patent is extended or adjusted under 35 U.S.C. 154(b) by 346 days.

(21) Appl. No.: 15/493,937

(22) Filed: Apr. 21, 2017

(65) Prior Publication Data

US 2017/0320292 A1    Nov. 9, 2017

(30) Foreign Application Priority Data

May 6, 2016 (JP) ................................. 2016-093089

(51) Int. Cl.
*B32B 7/12* (2006.01)
*B32B 27/30* (2006.01)
(Continued)

(52) U.S. Cl.
CPC ............... *B32B 7/12* (2013.01); *B32B 3/085* (2013.01); *B32B 3/30* (2013.01); *B32B 27/06* (2013.01); *B32B 27/08* (2013.01); *B32B 27/302* (2013.01); *B32B 27/308* (2013.01); *B32B 27/32* (2013.01); *B32B 27/325* (2013.01); *B32B 27/36* (2013.01); *B32B 27/365* (2013.01); *G06F 3/041* (2013.01); *G06F 3/044* (2013.01); *B32B 2250/24* (2013.01); *B32B 2255/10* (2013.01); *B32B 2307/206* (2013.01); *B32B 2307/30* (2013.01);
(Continued)

(58) Field of Classification Search
USPC ........................................................ 361/748
See application file for complete search history.

(56) References Cited

U.S. PATENT DOCUMENTS 6,060,137 A * 5/2000 Akao ..................... B32B 27/08
428/35.2
2011/0181545 A1 7/2011 Takahashi et al.
(Continued)

FOREIGN PATENT DOCUMENTS

EP          1081633 A2      3/2001
JP          2004-042510 A   2/2004
(Continued)

OTHER PUBLICATIONS

Extended European Search Report for Application No. Ep 17020173.5 published by the EPO, dated Sep. 8, 2017, including corresponding Communication, Annex, Information on Search Strategy, and 5-page EPO Form 1703.
(Continued)

*Primary Examiner* — Andargie M Aychillhum
(74) *Attorney, Agent, or Firm* — Kilyk & Bowersox, P.L.L.C.

(57) ABSTRACT

A plastic laminate structure including a plurality of, or a plurality of kinds of, plastic layers and an adhesive layer. The plastic layers are laminated together in a first direction. All the plastic layers are comprised exclusively of extruded plastic layers. The adhesive layer affixes together two of the plastic layers that are adjacent to each other in the first direction.

18 Claims, 3 Drawing Sheets

(51) Int. Cl.
    *G06F 3/041*     (2006.01)
    *B32B 3/08*     (2006.01)
    *B32B 27/32*     (2006.01)
    *B32B 27/36*     (2006.01)
    *B32B 27/08*     (2006.01)
    *B32B 3/30*     (2006.01)
    *B32B 27/06*     (2006.01)
    *G06F 3/044*     (2006.01)

(52) U.S. Cl.
    CPC ... *B32B 2307/308* (2013.01); *B32B 2307/518* (2013.01); *B32B 2307/702* (2013.01); *B32B 2307/708* (2013.01); *B32B 2307/734* (2013.01); *B32B 2307/736* (2013.01); *B32B 2307/748* (2013.01); *B32B 2457/208* (2013.01); *G06F 2203/04103* (2013.01)

(56) References Cited

U.S. PATENT DOCUMENTS

| | | |
|---|---|---|
| 2012/0256878 A1 | 10/2012 | Hashimoto et al. |
| 2013/0156987 A1* | 6/2013 | Fischer .............. B42D 15/0093 428/43 |
| 2015/0014030 A1 | 1/2015 | Mitamura et al. |
| 2016/0109625 A1* | 4/2016 | Guimard ............. H01L 51/0097 257/40 |

FOREIGN PATENT DOCUMENTS

| | | |
|---|---|---|
| JP | 2011154442 A | 8/2011 |
| JP | 2014012366 A | 1/2014 |
| JP | 2014016591 A | 1/2014 |
| JP | 2014115815 A | 6/2014 |
| JP | 2014159156 A | 9/2014 |
| JP | 2014166940 A | 9/2014 |
| JP | 2016055486 A | 4/2016 |
| WO | 2015087827 A1 | 6/2015 |

OTHER PUBLICATIONS

Asahi Kasei Amidas Co., Ltd. and Editorial office of Plastics, Plastic Databook, Dec. 1, 1999, p. 54 (see the translated Notification of Reasons for Refusal—attached—and the concurrently filed IDS Transmittal Letter that has comments on relevance).

Notification of Reasons for Refusal (Office Action) for Japanese Patent Application No. 2016-093089 issued by the Japan Patent Office (JPO), dispatch date Sep. 17, 2019, including English-language translation, 19 pages.

* cited by examiner

PLASTIC LAMINATE STRUCTURE AND TOUCH SENSING DEVICE HAVING THE SAME

CROSS-REFERENCE TO RELATED APPLICATIONS

The present application claims priority under 35 U.S.C. § 119 of Japanese Patent Application No. 2016-093089 filed on May 6, 2016, the disclosure of which is expressly incorporated by reference herein in its entity.

BACKGROUND OF THE INVENTION

Technical Field

The invention relates to a plastic laminate structure including extruded plastic layers, and a touch sensing devices having the plastic laminate structure.

Background Art

A conventional plastic laminate structure is disclosed in Japanese Unexamined Patent Application Publication No. 2004-42510. The plastic laminate structure includes a plurality of kinds of laminated sheets, and a molded plastic body injection-molded on the sheets. The plastic laminate structure is manufactured in the following manner. The sheets are placed into a molding die, and onto the sheets inside the molding die is injected some plastic material. The plastic material cools and solidifies on the sheets to form a molded plastic product.

SUMMARY OF INVENTION

Mold shrinkage occurs while the molded plastic cools and solidifies on the sheets. Such mold shrinkage induces such stresses to the molded plastic and the sheets as to separate the molded plastic and the sheets. Continued stresses to the molded plastic and the sheets may cause peeling of one or more of the sheets (one or more layers of the plastic laminate structure) from the molded plastic. Such peeling is more likely to occur if the sheets are comprised of a plurality of laminated layers, if the plastic laminate structure is curved, and/or if the plastic laminate structure is used in high-temperature/high-humidity environments.

During the manufacture of the plastic laminate structure, foreign substances may intrude between the molding die and the sheets. Such intrusion of foreign substances may leave marks of the foreign substances on the sheets.

In view of the above circumstances, the invention was made to provide a plastic laminate structure with reduced possibility of peeling of one or more of plastic layers from the other plastic layers, and with reduced possibility of intrusion of foreign substances during the fabrication of the plastic laminate structure. The invention also provides a touch sensing device having the plastic laminate structure.

A plastic laminate structure in an aspect of the invention includes a plurality of, or a plurality of kinds of, plastic layers and an adhesive layer. The plastic layers are laminated together in a first direction. All the plastic layers are comprised exclusively of extruded plastic layers. The adhesive layer affixes together two of the plastic layers that are adjacent to each other in the first direction.

In the plastic laminate structure in this aspect, it is possible to reduce the possibility that the adjacent plastic layers may peel from each other for the following reasons. All the plastic layers formed by extrusion molding to be laminated together in the first direction, and the adjacent plastic layers are affixed together with an adhesive layer. Therefore, after lamination, the affixed plastic layers are free from mold shrinkage, i.e. free from stress caused by mold shrinkage after injection molding. Further, since the plastic layers of the plastic laminate structure are not formed by injection molding, foreign substances are unlikely to intrude between an injection molding die and the plastic layers.

The plastic layers may be made of an amorphous plastic material. In the plastic laminate structure in this aspect, the plastic layers have relatively smaller thermal shrinkage ratios. This further contributes to reduced possibility that the adjacent plastic layers may peel from each other.

The plastic layers may be equal in flow direction and transverse direction. The transverse direction may preferably be orthogonal to the flow direction. In the plastic laminate structure in this aspect, it is possible to further reduce the possibility of pealing of the adjacent plastic layers from each other for following reason. Generally speaking, plastic layers formed by extrusion-molding tend to thermally shrink to different degrees in their flow directions, but to substantially the same degree in their traverse directions (i.e. substantially no difference). As the plastic layers of this aspect of the invention are equal in flow direction and transverse direction, contributing to reduced possibility that adjacent plastic layers may peel from each other due to differences in thermal shrinkage between the plastic layers.

The plastic layers may be principally made of the same polymer material or of polymers of a same type. In the plastic laminate structure of this aspect, the plastic layers expand and shrink to similar degrees. It is therefore possible to further reduce the possibility of peeling of adjacent plastic layers from each other.

The plastic layers may have a linear expansion coefficient or coefficients that fall within a range of $4 \times 10^{-5}$ cm/cm·° C. to $15 \times 10^{-5}$ cm/cm·° C. In the plastic laminate structure of this aspect, the plastic layers expand and shrink to similar degrees. It is therefore possible to further reduce the possibility of peeling of adjacent plastic layers from each other.

When the plastic layers thermally expand or shrink within a range of −40° C. to 85° C., a difference in total length between the adjacent plastic layers may be no more than 20% of a thicknesswise dimension of the adhesive layer between the adjacent plastic layers. Even if the plastic laminate structure in this aspect is used within an range of −40° C. to 85° C. and the plastic layers thermally expand and/or shrink, the adhesive layer conform to the plastic layers thermally expanded and/or shrunk The adhesive layer may have a glass transition temperature of 60° C. or higher. In the plastic laminate structure of this aspect, the adhesive layer is in vitrified state at temperatures lower than 60° C. It is therefore possible to further reduce the possibility of peeling of adjacent plastic layers from each other.

A touch sensing device of an aspect of the invention includes the plastic laminate structure of any aspect described above, and an electrode layer. The electrode layer is provided on one of the plastic layers and between said adjacent plastic layers. The touch sensing device of this aspect provides similar technical features as those of the plastic laminate structure of the same aspect.

The plastic layers may include a first plastic layer and may further include a second plastic layer. The electrode layer may include a first electrode layer and a second electrode layer.

The first electrode layer may be provided on the first plastic layer, and the second electrode layer may be provided on the second plastic layer. Alternatively, if the first plastic layer includes a first face and a second face respectively facing one side and the other side of the first direction, the first electrode layer may be provided on the first face of the first plastic layer, and the second electrode layer may be provided, not on the second plastic layer, but on the second face of the first plastic layer. In this case, the plastic layers may not include a second plastic layer. The touch sensing device may further include an insulation layer, in which case the insulation layer may be provided on and over the first electrode layer, and the second electrode layer may be provided on the insulation layer. In this case, the plastic layers may not include a second plastic layer.

The touch sensing device of any aspect described above may further include a rib bonded to the plastic laminate structure.

The plastic layers of any aspect described above may include an outermost layer being an endmost layer in one side of the first direction, and a deepest layer being an endmost layer in the other side in the first direction. The rib may be made of a plastic material of a same type, a same plastic material, a polymer alloy containing a plastic material of a same type, or a polymer alloy containing a same plastic material, as the deepest layer. The rib may be molded on the deepest layer.

The rib may be molded on the deepest layer. In the touch sensing device of this aspect, adhesiveness and compatibility is improved between the rib and the deepest layer, resulting in secure fixation therebetween.

At least one of the plastic layers of any aspect described above may have a retardation value in a range of 3,000 to 30,000 nm.

In one aspect of the invention, there is provided a method for manufacturing a touch sensing device, which includes preparing a plurality of plastic layers, or a plurality of kinds of, plastic layers which have been extruded, providing an electrode layer on one of the plastic layers, and laminating the plastic layers in a first direction. The lamination of the plastic layers includes affixing, with an adhesive layer, two of the plastic layers adjacent to each other in the first direction.

The manufacturing method of this aspect reduces the possibility of peeling of adjacent plastic layers from each other for the following reason. When the plastic layers are extruded to be laminated together in the first direction, adjacent plastic layers are affixed together with an adhesive layer. Therefore, after lamination, the affixed plastic layers are free from mold shrinkage, i.e. free from stress caused by mold shrinkage after injection molding. Further, since the plastic layers of the plastic laminate structure does not require injection molding, foreign substances are unlikely to intrude between an injection molding die and the plastic layers.

In the manufacture of a touch sensing device, the plurality of, or the plurality of kinds of, plastic layers are extruded to have any aspect as described above. The plastic layers may include a first plastic layer and may further include a second plastic layer. The electrode layer may include a first electrode layer and a second electrode layer.

The step of providing the electrode layer on the plastic layer may include providing the first electrode layer on the first plastic layer and providing the second electrode layer on the second plastic layer. Alternatively, if the first plastic layer includes a first face and a second face respectively facing one side and the other side of the first direction, the step of providing the electrode layer on the plastic layer may include providing the first electrode layer on the first face of the first plastic layer, and providing the second electrode layer on the second face of the first plastic layer. Alternatively, if the touch sensing device further includes an insulation layer, the step of providing the electrode layer on the plastic layer may include providing the first electrode layer on the first plastic layer, providing the insulation layer on and over the first electrode layer, and providing the second electrode layer on the insulation layer.

The manufacturing method of any aspect described above may further include bonding a rib to the plastic laminate structure after laminating the plastic layers. The bonding of the rib may include molding the rib on the deepest layer of the plastic laminate structure.

The manufacturing method of any aspect described above may further include shaping the plastic laminate structure, by subjecting the plastic laminate structure to vacuum forming, pressure forming, or stamping, after laminating the plastic layers.

BRIEF DESCRIPTION OF DRAWINGS

The present invention can be even more fully understood with the reference to the accompanying drawings which are intended to illustrate, not limit, the present invention.

DESCRIPTION OF EMBODIMENTS

The following describes first to fourth embodiments of the invention.

First Embodiment

Figure 1A:
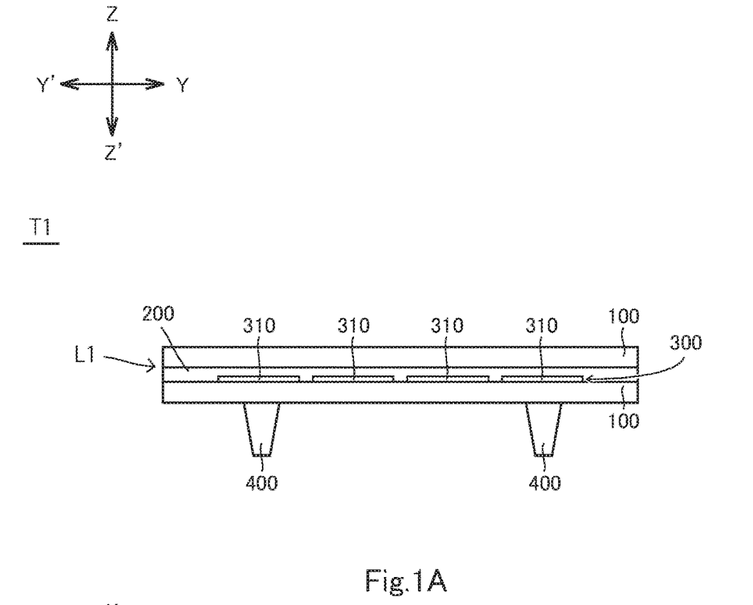
FIG. 1A is a schematic cross-sectional view of a touch sensing device according to a first embodiment of the invention.
Figure 1B:
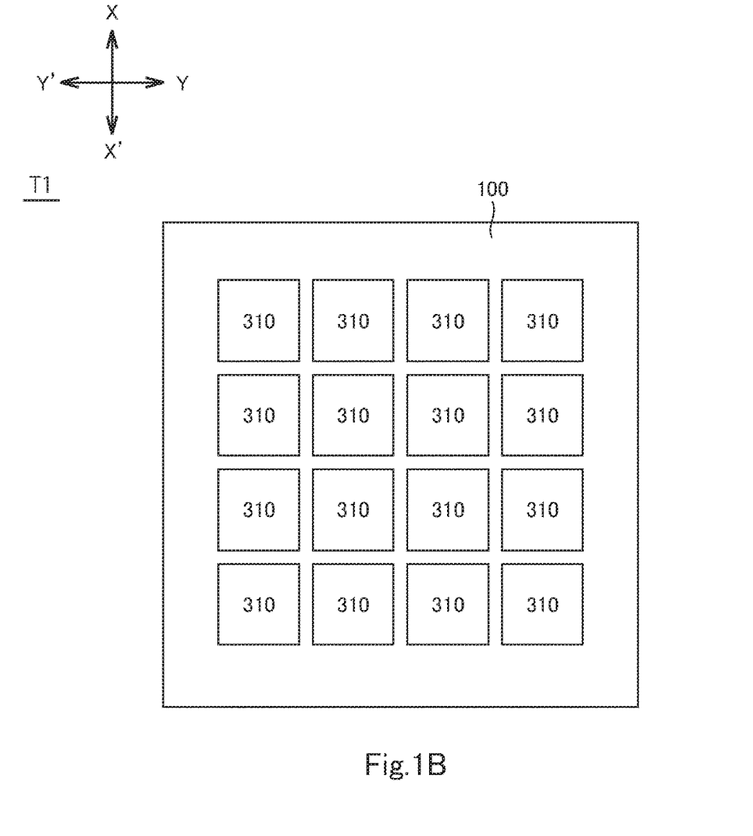
FIG. 1B is a schematic plan view of the touch sensing device.

A touch sensing device T1 according to the first embodiment of the invention will be described with reference to FIGS. 1A and 1B. The Z-Z' direction indicated in FIG. 1A corresponds to the thicknesswise direction of the plastic laminate structure L1 of the touch sensing device T1 and also corresponds to a first direction defined in claims. The Z and Z' directions respectively correspond to one side and the other side of the first directions as recited in the claims. The Y-Y' direction indicated in FIGS. 1A and 1B corresponds to the longitudinal direction of the plastic laminate structure L1 of the touch sensing device T1. The Y-Y' direction is orthogonal to the Z-Z' direction. The X-X' direction indicated in FIG. 1B corresponds to the widthwise direction of the plastic laminate structure L1 of the touch sensing device T1. The X-X' direction is orthogonal to the Z-Z' and Y-Y' directions.

The touch sensing device T1 includes the plastic laminate structure L1. The plastic laminate structure L1 may have, in its entirety, a flat shape (platelike shape) extending in the Y-Y' and X-X' directions, as illustrated in FIGS. 1A and 1B. Alternatively, the plastic laminate structure may have, in its entirety, some other shape than a flat shape. In the latter case, the plastic laminate structure L1 may have, for example, one of the following shapes 1) to 3): 1) The plastic laminate structure L1 is curved in its entirety. For example, the plastic laminate structure L1 is curved in the Y-Y' and/or X-X' directions; 2). The plastic laminate structure L1 has at least one flat portion and at least one curved portion. For example, the plastic laminate structure L1 has a flat central portion and an end or peripheral portion curved in an arc shape in the Y-Y' and/or X-X' directions. 3) The plastic laminate structure L1 has at least one portion with projections and depressions.

The plastic laminate structure L1 includes a plurality of, or a plurality of kinds of, plastic layers 100, and at least one adhesive layer 200. All the plastic layers 100 of the touch sensing device T1 are extruded sheets or extruded films. The touch sensing device T1 does not include any plastic layers that are not extruded plastic layers. In other words, the plastic layers of the touch sensing device T1 are extruded plastic layers 100 only. The plastic layers 100, formed by the extrusion molding, are uniform in plastic orientation and substantially uniform in plastic density distribution, and virtually free of strain distribution other than those resulting from the shape of the plastic laminate structure L1.

The plastic layers 100 may each have been subjected to processing, such as coating processing, so as to function as a hardcoat layer, an anti-glare layer, a antireflection layer, a low-reflective layer, an electrode substrate layer, a protective layer, an anti-Newton layer, a strength retention layer, an stain-proof layer, a phase-retarder layer (which may be a super retarder film layer (SRF layer)) and/or a anti-fingerprint treated layer, and/or the like. For example, in an embodiment shown in FIG. 1A, the lower (as shown) plastic layer 100 may have been so processed as to function as a strength retention layer and an electrode substrate layer, and the upper (as shown) plastic layer 100 may have been so processed as to function as a hardcoat layer, a low-reflective layer, a fingerprint-proof layer, and a protective layer. If the plastic layer 100 has been subjected to processing so as to function as a super-retardation-film layer, the plastic layer 100 may preferably have a retardation value in a range of 3,000 to 30,000 nm. If at least one of the plastic layer 100 has been processed to function as a strength retention layer, the or each processed plastic layer 100 may have a larger dimension in the Z-Z' direction than a plastic layer 100 that has not been processed to function as a strength retention layer. For example, the or each processed plastic layer 100 may have a Z-Z' direction dimension approximately in the range of 1.5 mm to 2.5 mm, while a plastic layer 100 that has been so processed as to function as an electrode substrate layer (i.e. has not been so processed as to function as an a strength retention layer) may have a Z-Z' direction dimension approximately in the range of 30 µm to 300 µm. If none of the plastic layers 100 has been processed to function as a strength retention layer, it is preferable that the plastic laminate structure L1 be so structured as to guarantee a predetermined strength in its entirety. For example, the plastic laminate structure L1 in its entirety may preferably have enough strength to prevent occurrence of a large crack in the plastic laminate structure L1, when subjected to a steel-ball drop test for impact energy absorption of 10 to 50 J.

The plastic layers 100 may each be optically transparent, translucent, or opaque. The plastic layers 100 may each be flexible or non-flexible (rigid). Ornamental printing may be applied on one or more of the plastic layers 100.

The plastic layers 100 are laminated together in the Z-Z' direction. The plastic layers 100 may be comprised of two plastic layers 100 as shown in FIGS. 1A and 1B, or they may be comprised of three or more plastic layers 100. An adhesive layer 200 is used to affix together the two plastic layers 100, or an adhesive layer 200 is used to affix each two of the plastic layers 100 that are adjacent to each other in the Z-Z' direction. For convenience of description, any two plastic layers that are adjacent to each other in the lamination direction of plastic layers of a plastic laminate structure may be referred to as "adjacent plastic layers", and "adjacent" herein means that between the two plastic layers no other plastic layers are present but a layer or layers of other kind may be present). Also, the plastic layer 100 that is an endmost layer in the Z direction may be referred to as an outermost layer, and the plastic layer 100 that is an endmost layer in the Z' direction may be referred to as a deepest layer.

The plastic layers 100 may each meet at least one of the following conditions 1) to 5). Condition 1): The plastic layers 100 are formed from amorphous plastic materials or crystalline plastics. Amorphous plastics may be, for example, polycarbonate (PC), polystyrene (PS), cyclo olefin copolymer (COC), cyclo olefin polymer (COP), polymethyl methacrylate (PMMA), and the like. Amorphous plastics are solidified without regular arrangement of molecular chains, i.e. without definite orientations. Amorphous plastics exhibit favorable formability in extrusion molding and relatively small thermal shrinkages during molding. Amorphous plastics have high transparency. Crystalline plastics may be, for example, polyethylene terephthalate (PET), polypropylene (PP), and the like. Condition 2): The plastic layers 100 may each be biaxially stretched in the Y-Y' and X-X' directions. In this case, all the plastic layers 100 are equal in flow direction (machine direction, MD) and transverse direction (TD). The transverse direction is orthogonal to the flow direction. In the embodiment of FIGS. 1A and 1B, the flow direction corresponds to the Y-Y' direction and the transverse direction corresponds to the X-X' direction.

Condition 3): The plastic layers 100 are principally made of the same polymer material or polymer material of the same type. Condition 4): The plastic layers 100 have a linear expansion coefficient or coefficients that fall within a temperature range of $4 \times 10^{-5}$ cm/cm·° C. to $15 \times 10^{-5}$ cm/cm·° C. For example, if the plastic layers 100 are formed from polycarbonate or cycloolefin polymer, they have a linear expansion coefficient of about $6.5 \times 10^{-5}$ cm/cm·° C. Condition 5): When the plastic layers 100 thermally expand or shrink at an environmental temperature at which the touch sensing device T1 is used, the difference in total length between adjacent plastic layers 100 is no more than 20% of the Z-Z' direction dimension (the thicknesswise dimension) of the adhesive layer 200 between the adjacent plastic layers 100. Further, if the touch sensing device T1 is for automotive applications, the environmental temperature should range from −40° C. to 85° C. If the touch sensing device T1 is for consumer applications, the environmental temperature should range from −10° C. to 60° C. The environmental temperature for the touch sensing device T1 is not limited to the above-described ranges but may be defined appropriately depending on the applications. The above condition 5) may specifically be at least one of the following configurations 5-1) to 5-4). 5-1) the materials of the plastic layers 100 have thermal expansion/shrinkage coefficients of the same or similar values. 5-2) The adhesive layer 200, or at least one of the adhesive layers 200, is enlarged in Z-Z' direction dimension (thicknesswise dimension). 5-3) The plastic layers 100 are formed of unstretched films. Such plastic layers 100 are not biaxially stretched may all be equal in flow direction (MD) and transverse direction (TD). 5-4) The plastic layers 100 are molded under controlled conditions.

The or each adhesive layer 200 affixes adjacent plastic layers 100 together as described above. The or each adhesive layer 200 may be constituted by, for example, wet laminating adhesive, dry laminating adhesive, hot-melt adhesive, or the like. The dry laminating adhesive agent may be Optical Clear Adhesive (trademark, OCA), for example. The adhesive layer 200 may have a glass transition temperature (Tg) higher than or equal to the maximum value of the above-described environmental temperature range. Specifically, if the touch sensing device T1 is for automotive applications, the adhesive layer 200 should have a glass transition temperature of 85° C. or higher. If the touch sensing device T1 is for consumer applications, the adhesive layer 200 should have a glass transition temperature of 60° C. or higher. Alternatively, the adhesive layer 200 may have viscoelasticity within the environmental temperature range described above.

The touch sensing device T1 may be a surface-capacitive touch panel or a projected-capacitive touch panel.

The touch sensing device T1 further includes at least one electrode layer 300. The or each electrode layer 300 is adapted to detect a detection object (for example, a human finger or a conductor in a stylus) approaching the outermost layer by any of the above-described capacitive types. The or each electrode layer 300 is disposed on and in contact with one of the plastic layers 100 and between two adjacent plastic layers 100 affixed together with the adhesive layer 200.

If the touch sensing device T1 is a surface-capacitive touch panel, a single electrode layer 300 may be provided therein. The electrode layer 300 includes a single electrode 310 constituted by a transparent conductive film or any other conductor. The transparent conductive film may be formed from, for example, indium tin oxide (ITO), antimony tin oxide (ATO) or the like. The electrode 310 is configured such that electric field values at corners (e.g. four corners) of the electrode 310 change in response to a detection object approaching the outermost layer.

If the touch sensing device T1 is a projected-capacitive touch panel, a single electrode layer 300 may be provided therein. The electrode layer 300 includes a plurality of electrodes 310 constituted by a transparent conductive film or any other conductor. The transparent conductive films may be formed from, for example, indium tin oxide (ITO), carbon nanotube (CNT), indium zinc oxide (IZO), aluminum-doped zinc oxide (AZO), conductive polymers, such as PEDOT and PSS, or the like. The conductor may be constituted by, for example, photosensitive silver, silver nano-ink, silver nano-wires, vapor-deposited copper, rolled copper, copper nano-ink, or the like. The electrodes 310 are provided on and in contact with one of the plastic layers 100, arranged at spaced intervals. The touch sensing device T1 of projected-capacitive type may specifically be a self-capacitive touch panel or a mutual-capacitive touch panel.

The touch sensing device T1 is a self-capacitive touch panel, the electrodes 310 are configured such that capacitance between a detection object and each electrode 310 changes in response to a detection object approaching the outermost layer, accordingly changing an electric signal (voltage or current) from each electrode 310. As a variant, the touch sensing device T1 may be a self-capacitive touch switch. In this case, the electrode layer 300 requires at least one electrode 310.

If the touch sensing device T1 is a mutual-capacitive touch panel, adjacent two of the electrodes 310 serve as a driving electrode (drive electrode) and a detection electrode (sensor electrode). FIG. 1B shows an example of the electrode layer 300 including electrodes 310 in first, second, third, and fourth rows, from the left side to the right side as shown. The electrodes 310 in the first and third rows may serve as driving electrodes, and the electrodes 310 in the second and fourth rows may serve as detection electrodes. Alternatively, the electrodes 310 in the first and third rows may serve as detection electrodes, and the electrodes 310 in the second and fourths rows may serve as driving electrodes. Each driving electrode is electrostatically coupled to the adjacent detection electrode. Capacitance between adjacent driving and detection electrodes changes in response to approach of a detection object. In accordance with the capacitance change, an electric signal (voltage or current) from a concerned detection electrode changes. As a variant, the touch sensing device T1 may be a mutual-capacitive touch switch. In this case, the electrode layer 300 requires at least two electrodes 310 adjacent to each other.

The touch sensing device T1 may further include a detection part, not shown. If the touch sensing device T1 is a surface-capacitive touch panel, the detection part is a detection circuit for detecting a touch position in the outermost layer touched by a detection object, by detecting changes in electric field values at the (four) corners of the electrode 310. If the touch sensing device T1 is a self-capacitive touch panel or a self-capacitive touch switch, the detection part is a detection circuit for detecting a touch position in the outermost layer touched by a detection object, by detecting changes of electric signals (voltages or currents) from the electrodes 310. If the touch sensing device T1 is a mutual-capacitive touch panel or a mutual-capacitive touch switch, the detection part is a detection circuit for detecting a touch position in the outermost layer touched by a detection object, by detecting changes of electric signals (voltages or currents) from the detection electrodes. It should be noted that the touch sensing device T1 may be provided without the detection part if a detection part is provided in electronic apparatus equipped with the touch sensing device T1.

The touch sensing device T1 may further include a plurality of ribs 400. The ribs 400 are bonded to the deepest layer of the plastic laminate structure L1. The ribs 400 may be formed, for example, from the same plastic material or the same type of plastic material, or from a polymer alloy containing the same material or the same type of plastic material, as that of the deepest layer. The ribs 400 of such material provide improved adhesiveness and compatibility between the ribs 400 and the deepest layer, resulting in secure fixation therebetween. The ribs 400 may be also formed from some other material. The ribs 400 may be mounted to above-described electronic apparatus, particularly at a frame, a display device, or some other part thereof. The ribs 400 may be omitted.

The touch sensing device T1 described above may be manufactured in the following steps. The touch sensing device T1 here has a single electrode layer 300. At first, the plurality of, or the plurality of kinds of, plastic layers 100 are prepared. More specifically, an extrusion molding machine is used to extrude molten plastic material, or molten plastic material of different kinds, into sheet or film shapes to form the plurality of, or the plurality of kinds of, plastic layers 100. The molten plastic materials may be crystalline plastic materials or amorphous plastic materials. During the extrusion molding, the molten plastic materials may be also subjected to biaxial stretching in the Y-Y' and X-X' directions. The molten plastic materials may be principally the same polymer material or polymer material of the same type. The molten plastic materials may have linear expansion coefficients of the same or similar values. The plastic layers 100 may be designed in materials, viscosities of the materials, conditions for the extrusion molding of the plastic layers 100, and/or other conditions, such that when the plastic layers 100 thermally expand or shrink the above described environmental temperature, the expansion or shrinkage difference of the total lengths of adjacent plastic layers 100 is equal to or lower than 20% of the Z-Z' direction dimension (the thicknesswise dimension) of the adhesive layer 200 between the adjacent plastic layers 100. The extruded plastic layers 100 may be subsequently subjected to various types of processing, such as coating processing, so that each of the plastic layers 100 may function as a hardcoat layer, an anti-glare layer, a antireflection layer, a low-reflective layer, an electrode substrate layer, a protective layer, an anti-Newton layer, a strength retention layer, a stain-proof layer, a phase-retarder layer (which may be a super retarder film layer (SRF layer)), and/or a anti-finger-print treated layer. The plastic layers 100 are thus prepared.

Thereafter, the electrode or electrodes 310 of the electrode layer 300 is formed on one of the plastic layers 100. Thereafter, the plastic layers 100 are affixed to each other with the adhesive layer or layers 200, so that the plastic layers 100 are laminated together in the Z-Z' direction. At this time, the electrode layer 300 is placed between adjacent plastic layers 100. The plastic layers 100 may be laminated in such a manner that the plastic layers 100 are equal in flow direction and transverse direction. The plastic laminate structure L1 is thus obtained having a flat shape in its entirety.

To form a plastic laminate structure L1 of a shape that is not entirely flat as described above, the plastic laminate structure L1 is heated and softened, and it is subsequently subjected to vacuum forming, pressure forming, or press forming, using a die not shown. As a result, the plastic laminate structure L1 is deformed conforming to the shape of the die. For example, the plastic laminate structure L1 is at least partially curved in the Y-Y' and/or X-X' directions or to have projections and depressions. The plastic laminate structure L1 is thus shaped as desired.

If the touch sensing device T1 includes the ribs 400, the ribs 400 may be bonded with an adhesive agent or a double-sided adhesive tape to the deepest layer of the flat or desirably shaped plastic laminate structure L1. Alternatively, the flat or desirably shaped plastic laminate structure L1 may be placed into a mold not shown, followed by molding the ribs 400 on the deepest layer of the plastic laminate structure L1. This is how the touch sensing device T1 is manufactured.

The touch sensing device T1 described above provides at least the following technical features. As a first technical feature, there is reduced possibility of peeling of one of adjacent plastic layers 100 from the other layer for the following reasons. All the plastic layers 100 of the touch sensing device T1 are formed by extrusion molding. The plastic layers 100 are laminated together in the Z-Z' direction, with adjacent plastic layers 100 affixed together with the adhesive layer or layers 200. Therefore, the laminated plastic layers 100 are free from mold shrinkage, i.e. free from stress caused by mold shrinkage. Further, if the plastic layers 100 are formed from amorphous plastic materials, the plastic layers 100 expands and/or shrinks to a lesser degree. Further, generally speaking, the plastic layers 100, formed by extrusion-molding, tend to thermally shrink to different degrees in their flow directions, but to substantially the same degree in their traverse directions (i.e. substantially no difference). As the plastic layers 100 are equal in flow direction and transverse direction, there is a reduced possibility of peeling of adjacent plastic layers 100 due to differences in thermal shrinkage between the plastic layers 100. Also, if the plastic layers 100 are principally made of the same polymer material or a polymer material of the same type, the plastic layers 100 expand and shrink to similar degrees. Further, if the plastic layers 100 have linear expansion coefficients as specified above, the plastic layers 100 expand and shrink to similar degrees. Further, especially when the plastic layers 100 thermally expand or shrink at the above-described environmental temperature and the difference in total length between adjacent plastic layers 100 is no more than 20% of the Z-Z' direction dimension (the thicknesswise dimension) of the adhesive layer 200 between the adjacent plastic layers 100, the adhesive layer 200 can conform to the plastic layers 100 thermally expanded and/or shrunk. Still further, if the adhesive layer 200 has a glass transition temperature (Tg) equal to or higher than the maximum value of the above-described environmental temperature range, the adhesive layer 200 is in vitrified state an environmental temperature and therefore firmly bonds the adjacent plastic layers 100. Alternatively, if the adhesive layer 200 has viscoelasticity within the environmental temperature range described above, the adhesive layer 200 is in softened state at the environmental temperature and therefore conforms to adjacent adhesive layers 200 in response to peeling stress induced in the plastic layers 100.

As a second technical feature, the plastic layers 100 of the plastic laminate structure L1 of the touch sensing device T1 are not formed by injection molding, i.e. they are not formed in a molding die for injection molding. When manufacturing the conventional plastic laminate structure, the sheets are placed in a molding die to injection-mold the plastic body on the sheets, foreign substances may intrude between the sheets and the molding die. Such intrusion will not occur in the plastic layers 100 of the plastic laminate structure L1 of the touch sensing device T1. As a third technical feature, the plastic laminate structure L1 of the touch sensing device T1 has reduced distortion and a smaller retardation value. In other words, each plastic layer 100 has reduced uneven distributions of birefringence and reduced unevenness of birefringence. Accordingly, when a user views the touch sensing device T1 through a light polarization plate, such as polarizing sunglasses or the like, the plastic laminate structure L1 is unlikely to have iridescent unevenness.

The above technical features are prominent especially in one or more of the following conditions: (1) when the touch sensing device T1 is used in a moist and hot environment (i.e. in the above-described environmental temperature range), for example if the touch sensing device T1 is used as part of an instrument panel in an automobile; (2) if the plastic laminate structure L1 in its entirety has a different shape than flat shapes; and (3) if the plastic laminate structure L1 has a large area, e.g. 200 $cm^2$ to 20,000 $cm^2$.

Second Embodiment

Figure 2A:
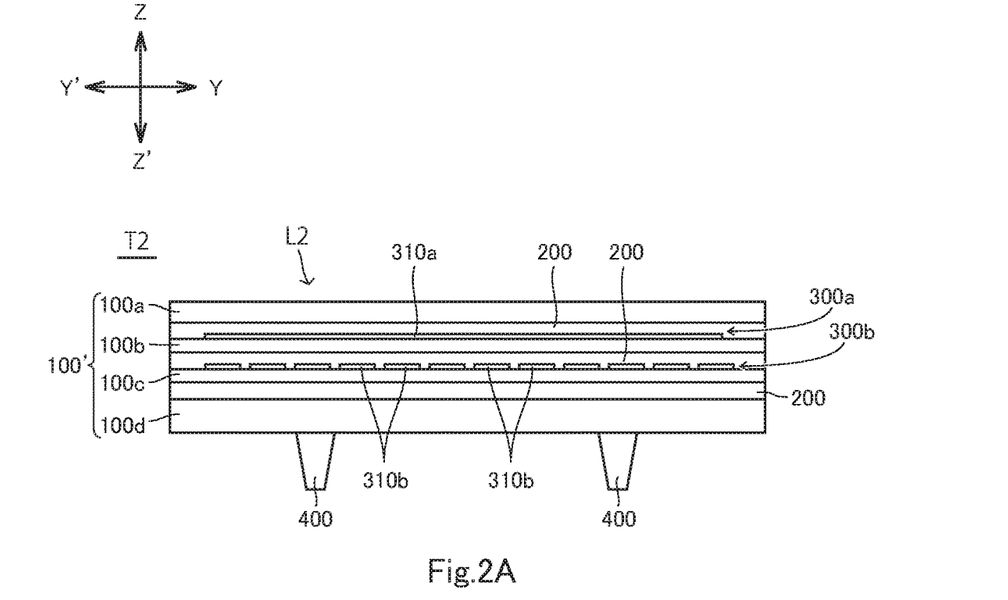
FIG. 2A is a schematic cross-sectional view of a touch sensing device according to a second embodiment of the invention.
Figure 2B:
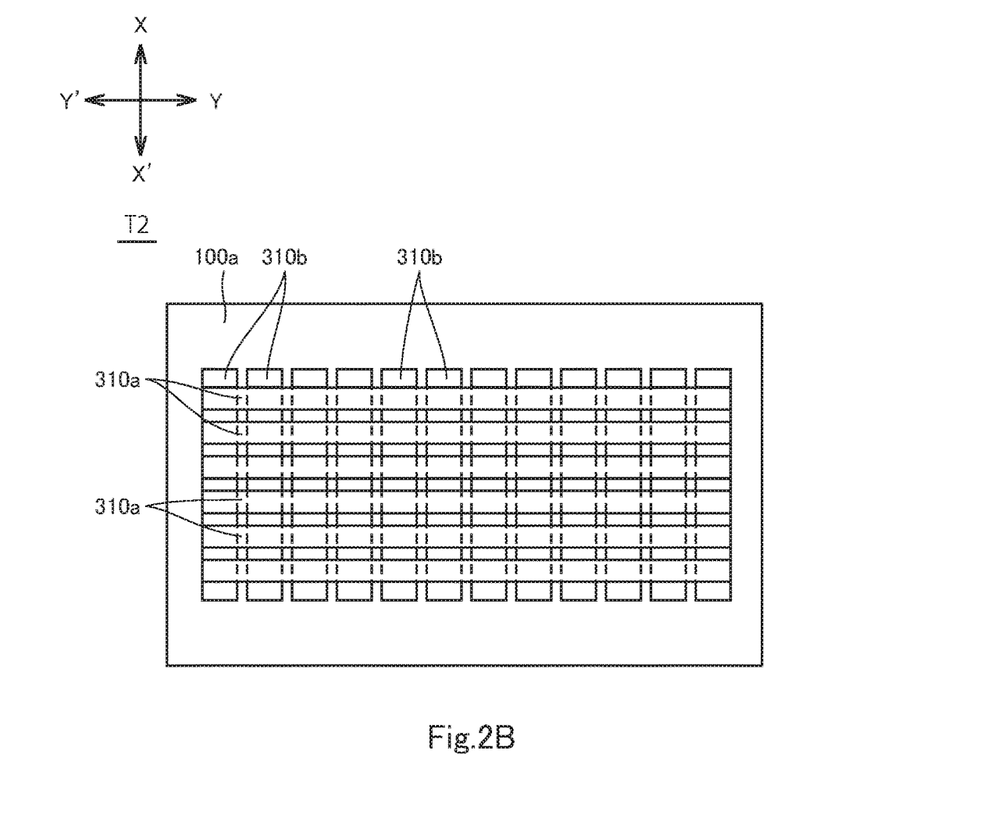
FIG. 2B is a schematic plan view of the touch sensing device.

A touch sensing device T2 according to the second embodiment of the invention will be described with reference to FIGS. 2A and 2B. The touch sensing device T2 is a mutual-capacitive touch panel and has the same structure as that of the touch sensing device T1, except the following differences. Difference 1): The touch sensing device T2 includes a first electrode layer 300a and a second electrode layer 300b, in place of the electrode layer 300. Difference 2): The touch sensing device T2 has a plastic laminate structure L2 including a plurality of, or a plurality of kinds of, plastic layers 100', and the plastic layers 100' include a first plastic layer and a second plastic layer. Difference 3): The plastic laminate structure L2 has a plurality of adhesive layers 200. These differences will be described in detail, while omitting descriptions of the touch sensing device T2 regarding the same components as those of the touch sensing device T1. It should be noted that the Z-Z' direction indicated in FIG. 2A corresponds to the thicknesswise direction of the plastic laminate structure L2 of the touch sensing device T2 and also corresponds to a first direction defined in claims. The Y-Y' direction indicated in FIGS. 2A and 2B corresponds to the longitudinal direction of the plastic laminate structure L2 of the touch sensing device T2. The Y-Y' direction is orthogonal to the Z-Z' direction. The X-X' direction indicated in FIG. 2B corresponds to the widthwise direction of the plastic laminate structure L2 of the touch sensing device T2. The X-X' direction is orthogonal to the Z-Z' and Y-Y' directions.

The plastic layers 100' may have the same configurations as those of the plastic layers 100 of the first embodiment. The plastic layers 100' include a plastic layer 100a, a plastic layer 100b (a first plastic layer as defined in the claims), a plastic layer 100c (a second plastic layer as defined in the claims), and a plastic layer 100d. The plastic layers 100' may further include a plastic layer or layers other than the plastic layers 100a to 100d. The plastic layers 100' are laminated together in the Z-Z' direction, and adjacent plastic layers 100' are affixed together with adhesive layers 200. More particularly, the plastic layers 100a, 100b, 100c, and 100d are laminated together in this order in the Z-Z' direction. The plastic layers 100a and 100b are adjacent to each other and affixed together with an adhesive layer 200. The plastic layers 100b and 100c are adjacent to each other and affixed together with another adhesive layer 200. The plastic layers 100c and 100d are adjacent to each other and affixed together with yet another adhesive layer 200. As shown in FIGS. 2A and 2B, the plastic layer 100a is the outermost layer, and the plastic layer 100d is the deepest layer.

The plastic layer 100a may have been so processed as to function as a protective layer. The plastic layer 100a may further have been so processed as to also function as a hardcoat layer, an anti-glare layer, an antireflection layer, a low-reflective layer, an anti-Newton layer, a strength retention layer, a stain-proof layer, a phase-retarder layer (which may be a super retarder film layer (SRF layer)), a anti-fingerprint treated layer, and/or the like. Ornamental printing may be applied on the plastic layer 100a.

The plastic layers 100b and 100c may have been so processed as to function as an electrode substrate layer. The plastic layers 100b and 100c may further have been so processed as to function as a hardcoat layer, an anti-glare layer, an antireflection layer, a low-reflective layer, an anti-Newton layer, a stain-proof layer, a phase-retarder layer (which may be a super retarder film layer (SRF layer)), an anti-fingerprint treated layer, and/or the like.

The plastic layer 100d may have been so processed as to function as a strength retention layer. The plastic layer 100d may further have been so processed as to function as a hardcoat layer, an anti-glare layer, a antireflection layer, a low-reflective layer, a protective layer, an anti-Newton layer, a stain-proof layer, a phase-retarder layer (which may be a super retarder film layer (SRF layer)), and/or an anti-fingerprint treated layer, and/or the like.

The first electrode layer 300a includes a plurality of first electrodes 310a being transparent conductive films or conductors. The first electrodes 310a extend in the Y-Y' direction on and in contact with the plastic layer 100b such as to be spaced apart from each other in the X-X' direction. The first electrodes 310a are placed between adjacent plastic layers 100a and 100b. The second electrode layer 300b includes a plurality of second electrodes 310b being transparent conductive films or conductors. The second electrodes 310b extend in the X-X' direction on and in contact with the plastic layer 100c such as to be spaced apart from each other in the Y-Y' direction. The second electrodes 310b are placed between adjacent plastic layers 100b and 100c. The first electrodes 310a and the second electrodes 310b intersect at different height positions in the Z-Z' direction. The first electrodes 310a are driving electrodes (drive electrodes) and the second electrodes 310b are detection electrodes (sensor electrodes), or alternatively the first electrodes 310a are detection electrodes (sensor electrodes) and the second electrodes 310b are driving electrodes (drive electrodes). The aforementioned transparent conductive films may be formed from indium tin oxide (ITO), carbon nanotube (CNT), indium zinc oxide (IZO), aluminum-doped zinc oxide (AZO), conductive polymers, such as PEDOT and PSS, or the like. The aforementioned conductors may be formed from a photosensitive silver, metal (e.g. Ag and Cu) with a line width of 15 µm or less formed by graph offset or other printing technology, silver nano-ink, silver nano-wires, metal wires, vapor-deposited copper, rolled copper, copper nano-ink, or the like.

The touch sensing device T2 described above may be manufactured in the following steps. The plurality of, or the plurality of types of, plastic layers 100' (the plastic layers 100a to 100d) are prepared, in a similar manner to the plastic layers 100 in the manufacture of the touch sensing device T1.

Thereafter, the first electrodes 310a of the first electrode layer 300a are formed on and in contact with the plastic layer 100b such as to be spaced apart from each other in the X-X' direction. The second electrodes 310b of the second electrode layer 300b are formed on and in contact with the plastic layer 100c such as to be spaced apart from each other in the Y-Y' direction.

Thereafter, the plastic layers 100a and 100b are affixed together with an adhesive layer 200, so that the first electrode layer 300a is placed between the plastic layers 100a and 100b. The plastic layers 100b and 100c are affixed together with another adhesive layer 200, so that the second electrode layer 300b is placed between the plastic layers 100b and 100c. Also, the plastic layers 100c and 100d are affixed together with the adhesive layer 200. As a result, the plastic layers 100a to 100d are laminated together in the Z-Z' direction. The lamination of the plastic layers 100a to 100d may be such that the plastic layers 100a to 100d are equal in flow direction and transverse direction. The plastic laminate structure L2 is thus obtained having a flat shape in its entirety.

The plastic laminate structure L2 may be formed to have a shape that is not entirely flat, in a similar manner to the manufacture of the touch sensing device T1. If the touch sensing device T2 includes ribs 400, the ribs 400 may preferably be bonded to the plastic laminate structure L2, in a similar manner (such as molding) to the manufacture of the touch sensing device T1. This is how the touch sensing device T2 is manufactured.

The above-described touch sensing device T2 provides similar technical features to those of the touch sensing device T1.

Third Embodiment

Figure 3:
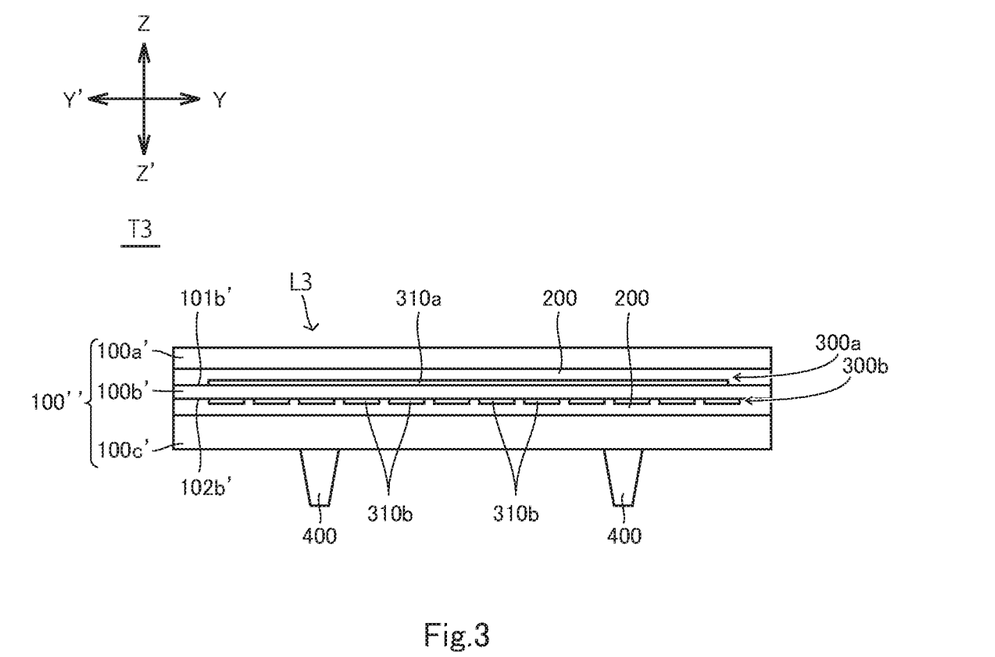
FIG. 3 is a schematic cross-sectional view of a touch sensing device according to a third embodiment of the invention.

A touch sensing device T3 according to the first embodiment of the invention will be described with reference to FIG. 3. The touch sensing device T3 is a mutual-capacitive touch panel and has the same structure as that of the touch sensing device T2, except the following differences. Difference 1): The plastic laminate structure L3 includes a plurality of, or a plurality of kinds of, plastic layers 100'', which includes the first plastic layer described above but not the second plastic layer described above. Difference 2): The first plastic layer has a first face 101b' and a second face 102b', the first electrode layer 300a is provided on and in contact with the first face 101b', and the second electrode layer 300b is provided on and in contact with the second face 102b'. These differences will be described in detail, while omitting descriptions of the touch sensing device T3 regarding the same components as those of the touch sensing device T2. As shown in FIG. 3, the Z-Z' and Y-Y' directions in this embodiment are defined in the same manner as in the touch sensing device T2. The X-X' direction in this embodiment is defined in the same manner in the touch sensing device T2 shown in FIG. 2B.

The plastic layers 100'' may have the same configurations as those of the plastic layers 100 of the first embodiment. The plastic layers 100'' include a plastic layer 100a', a plastic layer 100b' (the first plastic layer), and a plastic layer 100c'. The plastic layers 100'' may further include a plastic layer or layers other than the plastic layers 100a' to 100c'. The plastic layers 100'' are laminated together in the Z-Z' direction, and adjacent plastic layers 100'' are affixed together with adhesive layers 200. More particularly, the plastic layers 100a', 100b' and 100c' are laminated together in this order in the Z-Z' direction. The plastic layers 100a' and 100b' are adjacent to each other and affixed together with an adhesive layer 200. The plastic layers 100b' and 100c' are adjacent to each other and affixed together with another adhesive layer 200. As shown in FIG. 3, the plastic layer 100a' is the outermost layer, and the plastic layer 100c' is the deepest layer.

The plastic layer 100a' may have the same configuration as that of the plastic layer 100a of the touch sensing device T2. The plastic layer 100c' may have the same configuration as that of the plastic layer 100d of the touch sensing device T2.

The plastic layer 100b' may have the same configuration as that of the plastic layer 100b of the touch sensing device T2, except that the plastic layer 100b' has a first face 101b' facing the Z direction and the second face 102b' facing the Z' direction.

The first electrode layer 300a of the touch sensing device T3 has the same configuration as that of the first electrode layer 300a of the touch sensing device T2, except that first electrodes 310a are provided on and in contact with the first face 101b' of the plastic layer 100b'. The second electrode layer 300b of the touch sensing device T3 has the same structure as that of the second electrode layer 300b of the touch sensing device T2, except that second electrodes 310b are provided on and in contact with the second face 102b' of the plastic layer 100b'.

The touch sensing device T3 described above may be manufactured in the following steps. The plurality of, or the plurality of types of, plastic layers 100'' (the plastic layers 100a' to 100c') are prepared, in a similar manner to the plastic layers 100 in the manufacture of the touch sensing device T1.

Thereafter, the first electrodes 310a of the first electrode layer 300a are formed on and in contact with the first face 101b' of the plastic layer 100b' such as to be spaced apart from each other in the X-X' direction. The second electrodes 310b of the second electrode layer 300b are formed on and in contact with the second face 102b' of the plastic layer 100b' such as to be spaced apart from each other in the Y-Y' direction.

Thereafter, the plastic layers 100a' and 100b' are affixed together with the adhesive layer 200, so that the first electrode layer 300a is placed between the plastic layers 100a' and 100b'. Also, the plastic layers 100b' and 100c' are affixed together with another adhesive layer 200, so that the second electrode layer 300b is placed between the plastic layers 100b' and 100c'. As a result, the plastic layers 100a' to 100c' are laminated together in the Z-Z' direction. The lamination of the plastic layers 100a' to 100c' may be such that the plastic layers 100a' to 100c' are equal in flow direction and transverse direction. The plastic laminate structure L3 is thus obtained having a flat shape in its entirety.

The plastic laminate structure L3 may be formed to have a shape that is not entirely flat, in a similar manner to the manufacture of the touch sensing device T1. If the touch sensing device T3 includes ribs 400, the ribs 400 may preferably be bonded to the plastic laminate structure L3, in a similar manner (such as molding) to the manufacture of the touch sensing device T1. This is how the touch sensing device T3 is manufactured.

The above-described touch sensing device T3 provides similar technical features to those of the touch sensing device T1.

Fourth Embodiment

Figure 4:
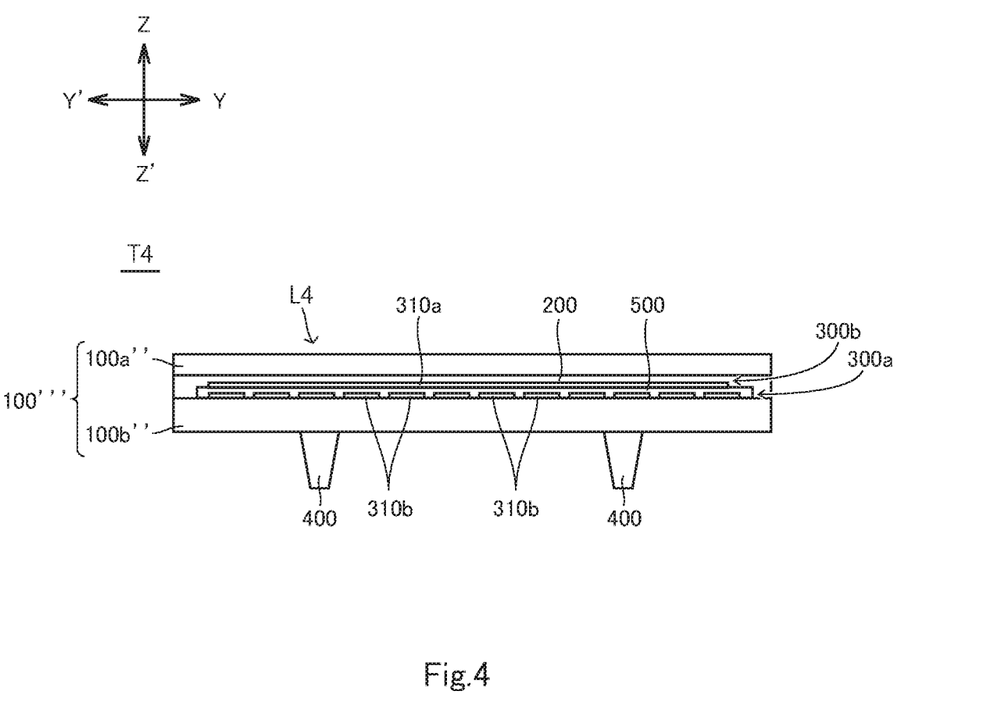
FIG. 4 is a schematic cross-sectional view of a touch sensing device according to a fourth embodiment of the invention.

A touch sensing device T4 according to the fourth embodiment of the invention will be described with reference to FIG. 4. The touch sensing device T4 is a mutual-capacitive touch panel and has the same structure as that of the touch sensing device T2, except the following differences. Difference 1): The touch sensing device T4 further includes an insulation layer 500. Difference 2): The plastic laminate structure L4 includes a plurality of, or a plurality of kinds of, plastic layers 100''', which includes the first plastic layer described above but not the second plastic layer described above. Difference 3): A first electrode layer 300a, an insulation layer 500, and a second electrode layer 300b are laminated, in this order in the Z-Z' direction, on the first plastic layer. These differences will be described in detail, while omitting descriptions of the touch sensing device T4 regarding the same components as those of the touch sensing device T2. As shown in FIG. 4, the Z-Z' and Y-Y' directions in this embodiment are defined in the same manner as in the touch sensing device T2. The X-X' direction in this embodiment is defined in the same manner in the touch sensing device T2 shown in FIG. 2B.

The plastic layers 100''' may have the same configurations as those of the plastic layers 100 of the first embodiment. The plastic layers 100''' include a plastic layer 100a'' and a plastic layer 100b'' (the first plastic layer). The plastic layers 100''' may further include a plastic layer or layers other than the plastic layers 100a" and 100b". The plastic layers 100'" are laminated together in the Z-Z' direction, and adjacent plastic layers 100'" are affixed together with an adhesive layer or layers 200. More particularly, the plastic layers 100a" and 100b" are laminated together in this order in the Z-Z' direction. The plastic layers 100a" and 100b" are adjacent to each other and affixed together with an adhesive layer 200. As shown in FIG. 4, the plastic layer 100a" is the outermost layer, and the plastic layer 100b" is the deepest layer.

The plastic layer 100a" may have the same configuration as that of the plastic layer 100a of the touch sensing device T2. The plastic layer 100b" may have been so processed as to function as a strength retention layer and an electrode substrate layer. The plastic layer 100b" may have been so processed as to function as a hardcoat layer, an anti-glare layer, an antireflection layer, a low-reflective layer, a protective layer, an anti-Newton layer, a stain-proof layer, a phase-retarder layer (which may be a super retarder film layer (SRF layer)), a anti-fingerprint treated layer, and/or the like.

The first electrode layer 300a of the touch sensing device T4 has the same structure as that of the first electrode layer 300a of the touch sensing device T2, except that first electrodes 310a are provided on and in contact with the plastic layer 100b". The insulation layer 500 is provided on and over the first electrode layer 300a. The second electrode layer 300b has the same structure as that of the second electrode layer 300b of the second embodiment, except that second electrodes 310b are provided on and in contact with the insulation layer 500. The first electrode layer 300a, the insulation layer 500 and the second electrode layer 300b are placed between the adjacent plastic layers 100a" and 100b".

The insulation layer 500 may be optically transparent, translucent, or opaque. The insulation layer 500 may each be flexible or non-flexible (rigid).

The touch sensing device T4 described above may be manufactured in the following steps. The plurality of, or the plurality of types of, 100'" (the plastic layers 100a" and 100b") are prepared, in a similar manner to the plastic layers 100 in the manufacture of the touch sensing device T1.

Thereafter, the first electrodes 310a of the first electrode layer 300a are formed on the plastic layer 100b" such as to be spaced apart from each other in the X-X' direction. The insulation layer 500 is formed on and over the first electrode layer 300a. The second electrodes 310b are formed on the insulation layer 500 such as to be spaced apart from each other in the Y-Y' direction.

Thereafter, the plastic layers 100a" and 100b" are affixed together with the adhesive layer 200, so that the first electrode layer 300a, the insulation layer 500, and the second electrode layer 300b are placed between the plastic layers 100a" and 100b". As a result, the plastic layers 100a" and 100b" are laminated together in the Z-Z' direction. The lamination of the plastic layers 100a" and 100b" may be such that the plastic layers 100a" and 100b" are equal in flow direction and transverse direction. The plastic laminate structure L4 is thus obtained having a flat shape in its entirety.

The plastic laminate structure L4 may be formed to have a shape that is not entirely flat, in a similar manner to the manufacture of the touch sensing device T1. If the touch sensing device T4 includes ribs 400, the ribs 400 may preferably be bonded to the plastic laminate structure L4, in a similar manner (such as molding) to the manufacture of the touch sensing device T1. This is how the touch sensing device T4 is manufactured.

The above-described touch sensing device T4 has provides similar technical features to those of the touch sensing device T1.

It should be appreciated that the touch sensing devices of the invention are not limited to the above-described embodiments and may be modified without departing from the scope of claims.

The electrode layer or layers of the invention may be omitted. If omitted, the plastic laminate structure of the invention is not limited to plastic laminate structures for touch sensing devices and may be applicable to other uses. For example, the plastic laminate structure of the invention may be so structured to include nothing between the plastic layers. Alternatively, the plastic laminate structure of the invention may be so structured to include other devices than electrode layers to be placed between plastic layers, namely, sheet sensors, display devices (e.g. organic electroluminescent displays), illumination devices, decorations, projection screens, heaters, electromagnetic shields, mirrors, piezoelectric elements, shock absorbers, telecommunication devices (e.g. antennas), power generators (e.g. solar cells), sterilization devices (e.g. UV light-emission devices and heat sources), electronic circuits, and/or the like. In other words, the invention is applicable to other applications than instrument panels in automobiles.

It should be appreciated that the above embodiments and variants of the invention are described above by way of examples only. The materials, shapes, dimensions, numbers, arrangements, and other configurations of the constituents of the invention may be modified in any manner if they can perform similar functions. The configurations of the embodiments and the variants described above may be combined in any possible manner.

The present invention can include any combination of these various features or embodiments above and/or below as set-forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

T1: Touch input device
L1: Plastic laminate structure
100: Plastic layer
200: Adhesive layer
300: Electrode layer
310: Electrode
400: Rib
T2: Touch input device
L2: Plastic laminate structure
100': Plastic layer
100a to 100d: Plastic layer
200: Adhesive layer
300a: First electrode layer
310a: First electrode
300b: Second electrode layer
310b: Second electrode
400: Rib
T3: Touch input device L3: Plastic laminate structure
100″: Plastic layer
100a′ to 100c′: Plastic layer
101b′: First face
102b′: Second face
200: Adhesive layer
300a: First electrode layer
310a: First electrode
300b: Second electrode layer
310b: Second electrode
400: Rib
T4: Touch input device
L4: Plastic laminate structure
100‴: Plastic layer
100a″ to 100b″: Plastic layer
200: Adhesive layer
300a: First electrode layer
310a: First electrode
300b: Second electrode layer
310b: Second electrode
400: Rib
500: Insulation layer

What is claimed is:

1. A plastic laminate structure comprising:
a plurality of, or a plurality of kinds of, plastic layers laminated together in a first direction, all the plastic layers being comprised exclusively of extruded plastic layers; and
an adhesive layer to affix together two of the plastic layers that are adjacent to each other in the first direction,
wherein, when the plastic layers thermally expand or shrink within a range of −40° C. to 85° C., a difference in total length between the adjacent plastic layers is no more than 20% of a thicknesswise dimension of the adhesive layer between the adjacent plastic layers.

2. The plastic laminate structure according to claim 1, wherein the plastic layers are made of an amorphous plastic material.

3. A touch sensing device comprising:
the plastic laminate structure according to claim 2; and
an electrode layer on and in physical contact with one of the plastic layers and between said adjacent plastic layers.

4. The plastic laminate structure according to claim 1, wherein
the plastic layers are equal in flow direction and transverse direction, and
the transverse direction is orthogonal to the flow direction.

5. A touch sensing device comprising:
the plastic laminate structure according to claim 4; and
an electrode layer on and in physical contact with one of the plastic layers and between said adjacent plastic layers.

6. The plastic laminate structure according to claim 1, wherein
the plastic layers are principally made of the same polymer material or of polymers of a same type.

7. A touch sensing device comprising:
the plastic laminate structure according to claim 6; and
an electrode layer on and in physical contact with one of the plastic layers and between said adjacent plastic layers.

8. The plastic laminate structure according to claim 1, wherein
the plastic layers have a linear expansion coefficient or coefficients that fall within a range of 4×10−5 cm/cm° C. to 15×10−5 cm/cm° C.

9. A touch sensing device comprising:
the plastic laminate structure according to claim 8; and
an electrode layer on and in physical contact with one of the plastic layers and between said adjacent plastic layers.

10. The plastic laminate structure according to claim 1, wherein
the adhesive layer has a glass transition temperature of 60° C. or higher.

11. A touch sensing device comprising:
the plastic laminate structure according to claim 10; and
an electrode layer on and in physical contact with one of the plastic layers and between said adjacent plastic layers.

12. A touch sensing device comprising:
the plastic laminate structure according to claim 1; and
an electrode layer on and in physical contact with one of the plastic layers and between said adjacent plastic layers.

13. The touch sensing device according to claim 12, wherein
the plastic layers include a first plastic layer and a second plastic layer,
the electrode layer comprises a first electrode layer and a second electrode layer,
the first electrode layer is provided on and in physical contact with the first plastic layer, and
the second electrode layer is provided on and in physical contact with the second plastic layer.

14. The touch sensing device according to claim 12, wherein
the plastic layers include a first plastic layer,
the first plastic layer includes a first face and a second face respectively facing one side and the other side of the first direction,
the electrode layer comprises a first electrode layer and a second electrode layer,
the first electrode layer is provided on and in physical contact with the first face of the first plastic layer, and
the second electrode layer is provided on and in physical contact with the second face of the first plastic layer.

15. The touch sensing device according to claim 12, further comprising an insulation layer, wherein
the plastic layers include a first plastic layer,
the electrode layer comprises a first electrode layer and a second electrode layer,
the first electrode layer is provided on and in physical contact with the first plastic layer,
the insulation layer is provided on and over the first electrode layer, and
the second electrode layer is provided on and in physical contact with the insulation layer.

16. The touch sensing device according to claim 12, further comprising a rib bonded to the plastic laminate structure.

17. The touch sensing device according to claim 16, wherein
the plastic layers include:
an outermost layer being an endmost layer in one side of the first direction, and
a deepest layer being an endmost layer in the other side in the first direction, and the rib is made of a plastic material of a same type, a same plastic material, a polymer alloy containing a plastic material of a same type, or a polymer alloy containing a same plastic material, as the deepest layer, and the rib is molded on the deepest layer.

18. The touch sensing device according to claim 12, wherein at least one of the plastic layers has a retardation value in a range of 3,000 to 30,000 nm.

* * * * *